United States Patent
Cronin

(10) Patent No.: US 6,216,016 B1
(45) Date of Patent: *Apr. 10, 2001

(54) METHOD AND SYSTEM FOR GENERATING AND TRANSMITTING A WAITING MESSAGE

(75) Inventor: Gerard T. Cronin, La Milesse (FR)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,643

(22) Filed: Nov. 24, 1997

(30) Foreign Application Priority Data

Nov. 28, 1996 (EP) .................................. 96402565

(51) Int. Cl.$^7$ .............................. H04B 1/40; H04M 1/02
(52) U.S. Cl. ................. 455/567; 455/414; 455/550; 379/266
(58) Field of Search .................... 455/567, 575, 455/414, 551, 550; 379/212, 214, 266, 265, 309

(56) References Cited

U.S. PATENT DOCUMENTS

| | | | |
|---|---|---|---|
| 4,608,458 | 8/1986 | Hashimoto | 179/2 |
| 4,696,028 * | 9/1987 | Morganstein et al. | 379/212 |
| 4,875,229 * | 10/1989 | Palett et al. | 455/550 |
| 4,975,941 * | 12/1990 | Morganstein et al. | 379/212 |
| 5,185,782 * | 2/1993 | Srinivasan | 379/214 |
| 5,189,692 | 2/1993 | Ferrara | 379/8.8 |
| 5,303,298 * | 4/1994 | Morganstein et al. | 379/212 |
| 5,317,624 * | 5/1994 | Obana et al. | 455/567 |
| 5,442,814 | 8/1995 | Seo | 455/89 |
| 5,471,518 * | 11/1995 | Barber et al. | 455/550 |
| 5,570,413 * | 10/1996 | Ahlberg et al. | 455/567 |
| 5,581,604 * | 12/1996 | Robinson et al. | 379/88.13 |
| 5,625,676 * | 4/1997 | Greco et al. | 379/88.14 |
| 5,646,589 * | 7/1997 | Murray et al. | 340/825.46 |
| 5,657,372 * | 8/1997 | Ahlberg et al. | 455/567 |
| 5,698,834 * | 12/1997 | Worthington et al. | 235/462.45 |
| 5,758,280 * | 5/1998 | Kimura | 455/567 |
| 5,867,796 * | 2/1999 | Inutsuka | 455/567 |
| 5,894,596 * | 4/1999 | Hayes, Jr. | 455/418 |

FOREIGN PATENT DOCUMENTS

| | | | |
|---|---|---|---|
| 0494526B1 | 7/1992 | (EP) . | |
| 0502617A2 | 9/1992 | (EP) | H04M/1/72 |
| 2049358A | 12/1980 | (GB) | H04M/1/64 |

* cited by examiner

Primary Examiner—Reinhard Eisenzopf
Assistant Examiner—Eliseo Ramos-Feliciano

(57) ABSTRACT

A portable telecommunications device has a radio transceiver, a keypad, a memory, and a microcontroller for controlling device functions. The portable telecommunications device receives an incoming call from a calling party that calls a called party who is operating the portable telecommunications device. Upon receiving the incoming call, the portable telecommunications device alerts the called party. When the called party presses a key other than the hook key, the portable telecommunications device starts periodic transmission of a waiting message to the calling party while putting the portable telecommunications device on hold. The portable telecommunications device halts the periodic transmission of waiting messages and returns to normal communication mode when the called party initiates such halting.

15 Claims, 3 Drawing Sheets

METHOD AND SYSTEM FOR GENERATING AND TRANSMITTING A WAITING MESSAGE

BACKGROUND OF THE INVENTION

The present invention relates to a portable telecommunications device comprising a radio transceiver, a keypad, memory means, and microprocessor means for controlling device functions, the device being controllable by a called party and the device further comprising alerting means for alerting the called party if an incoming call is received from a calling party. Such a portable telecommunications device can be any portable telecommunications device having voice telephony functionality, such as a cellular or cordless telephone, or the like.

The present invention further relates to a wireless telecommunications system, to a radio base station for such a system, and to a method for processing an incoming call in such a system.

A portable telecommunications device of the above kind is known from the European patent EP 0 494 526 B1. The known device is a cellular telephone having the functionality that the user can become aware of the identity of the calling party. Whether or not having this so-called Calling Line Identification functionality, an incoming call from the calling party could come at an inconvenient moment, e.g., during a meeting or in a very noisy environment, while the called party still desires to answer the call without disturbing other persons or without the necessity to talk very loud or without hearing clearly what the calling party is saying.

OBJECTS AND SUMMARY OF THE INVENTION

It is an object of the present invention to provide a portable telecommunications device not having the above drawbacks.

To this end the portable telecommunications according to the present invention is characterised in that the device comprises message generation means for generating a waiting message intended for the calling party, that the device comprises first initiating means for initiating periodic transmission of the waiting message to the calling party and for putting the device on hold while transmitting the waiting messages, and that the device comprises second initiating means for halting the transmission of the waiting messages and for putting the device in normal communication mode after halting of the transmission of waiting messages, the first and second initiating means being controllable by the called party. Herewith, the calling party is informed that his call is being answered and that the called party wants to talk to him after a relatively short waiting period during which he can go outside a meeting room or to a quieter room, or the like. Because of receiving the waiting message periodically, the calling party is aware of the fact that the called party's telecommunications device is on hold and that his call most likely will be answered so that he will not put his device on hook. The waiting message could have the contents "please, wait a moment", "please, wait a moment, I am going to find a more suitable room for answering your call", or the like, an could be repeated every 20 or 30 seconds, for instance.

In an embodiment of a telecommunications device according to the present invention, the first initiating means comprises a first key and the second initiating means comprises a second key, and alerting stops if the first key is pressed. Herewith, the called party can easily control the waiting message functionality.

In an embodiment of a telecommunications device according to the present invention, the first key is a key dedicated to the first initiating means and the second key is a key which can also be used for other telephone functions but on-hook. Herewith, only one additional key is needed.

In an embodiment of a telecommunications device according to the present invention, the memory means comprises non-volatile memory means for storing the waiting message. If the waiting message is stored by the manufacturer of the device, the called party has available the waiting message functionality immediately after buying the device. Particularly for called parties not willing to program all kinds of telephony functionality after buying, such an embodiment is advantageous. If the device comprises recording means, recorded waiting message can be stored in the non-volatile memory. This is advantageous in that the called party can adapt the waiting message to particular circumstances. If he intends to go to a meeting, he could record a message like "I am in a meeting, please, wait until I have found a different room" before entering the meeting room. If he is usually in a very noisy room and a quieter room is not far away, he could record a message like "I am in a very noise room, please, wait until I have found a quieter room". Then, the calling party will have an idea about the circumstances in which the called party is in and probably judge what time to wait. Herewith, the risk is reduced that the calling party puts his device on hook. In order to distract the calling party from the unpleasant waiting, a piece of recorded music could be transmitted in between the waiting messages.

In an embodiment of a telecommunications device according to the present invention, comprising a microphone, wherein the device is arranged for muting the microphone while transmitting the waiting messages. Herewith, it is prevented that the calling party receives undesired background signals while receiving the waiting messages.

In an embodiment of the telecommunications device according to the present invention, comprising speech recognition means, wherein the speech recognition means are arranged for recognising a waiting message command applied by the device for the initiation of the periodic transmission of waiting messages after recognition of the waiting message command. Herewith, an extra key can be saved that would otherwise be needed. Particularly, when reducing the size of devices such as a cellular phone it should be avoided to use many keys for many different functions. The use of a non-dedicated key would not be very practical because during a meeting, for instance, the first initiation should be done quickly, particularly if the called party is alerted via an audible alert.

In an embodiment of a telecommunications device according to the present invention, such as a vibration means. If the called party is in a meeting or in a church, for instance, other persons are not disturbed when the called party receives an incoming call.

In an embodiment of a telecommunications device according to the present invention, the device supports the functionality of calling line identification. Herewith, the called party can simply cancel the call if he receives an undesired call by putting his device on hook. He then does not have to initiate transmission of waiting messages.

In a embodiment of the present invention, the portable telecommunications device is menu driven, whereby the called party can program the portable device in advance so as to set the device in a particular mode. According to the present invention, the device can be set into a normal conversation mode and an announcement on answer mode during which waiting messages are transmitted to the calling party. Pressing any key other than the hook key could initiate the announcement on answer mode, and pressing the hook key could halt the transmission of waiting messages. This has the great advantage that no extra keys are needed for implementing method according to the present invention. If the portable device receives an incoming call when programmed in announcement on answer mode it is checked whether the called party answers the call within a predetermined time-out period after having initiated the announcement on answer mode, by checking the pressing of the hook key, for instance. This has the advantage that the called party is reminded of the fact that the calling party is still holding the line. Such a time-out period could be in the order of 30 seconds, or so.

The portable telecommunications device is comprised in a wireless telecommunications system, in particular a cordless telephone system, comprising a radio base station. The recording, storage, and generation of waiting messages can be done in the portable telecommunications device or in the radio base station, whereby the portable initiates starting and halting of the transmission of waiting messages.

BRIEF DESCRIPTION OF THE DRAWINGS

The present invention will now be described, by way of example, with reference to the accompanying drawings, wherein FIG. 1 schematically shows a cellular telephony system.

Throughout the figures the same reference numerals are used for the same features.

DETAILED DESCRIPTION OF THE PREFERRED EMBODIMENT

Figure 1:
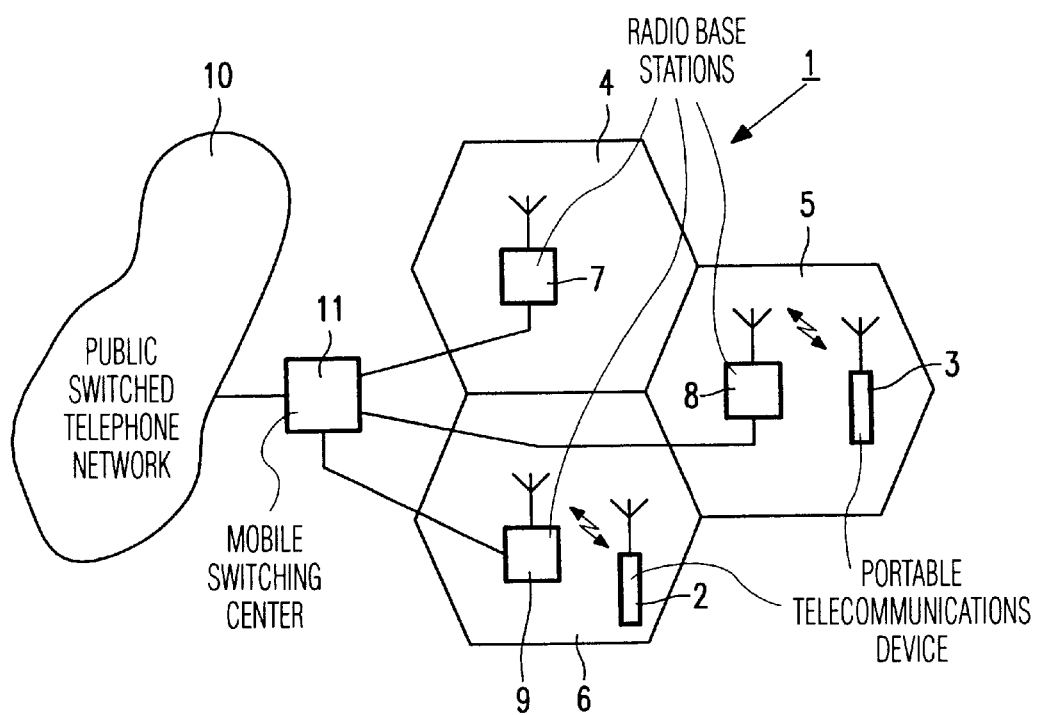

FIG. 1 schematically shows a shows a cellular telephony system 1 comprising a first portable telecommunications device 2 coupled to a second telecommunications device 3, the devices being suitable for at least telephony speech traffic. In the example given the first device 2 is the operated by a calling party and the second device 3 is operated by a called party receiving an incoming call from the calling party. The device 3 can be arranged for supporting Calling Line Identification, well-known in the art. The cellular system comprises radio zones 4, 5, 6 covered by radio base stations 7, 8, and 9 which are coupled to a public switched telephone network 10 via a mobile switching centre 11. The calling party can also be a fixed network subscriber of the public switched telephone network 10.

Figure 2:
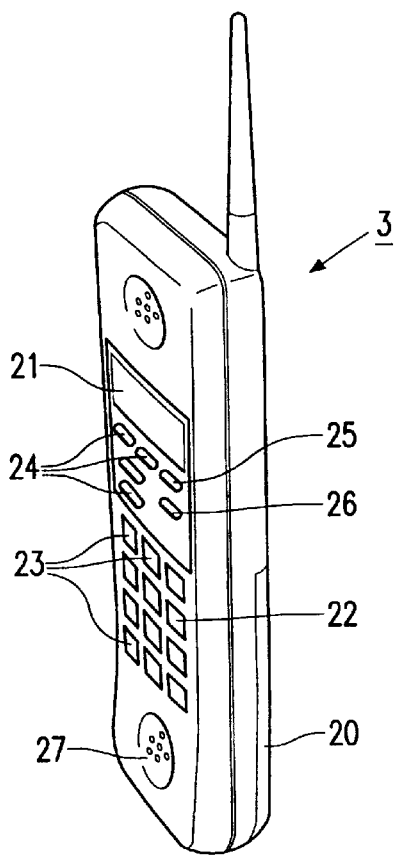
FIG. 2 shows a perspective view of a portable telecommunications device according to the present invention.

FIG. 2 shows a perspective view of the portable telecommunications device 3 according to the present invention. The device 3 is a portable cellular telephone powered by a rechargeable battery pack 20. The user interface of the telephone 3 comprises a liquid crystal display 21, a keypad 22 comprising two sets of keys 23 and 24 of alphanumeric keys associated with alphanumeric data, particularly for dialling of telephone numbers and of function keys for enabling predetermined functions or operations, respectively. According to the present invention a first key 25 is provided for initiating transmission of waiting messages to a calling party when receiving an incoming call, after the telephone call is put in a hold mode, and a second key 26 is provided for halting the transmission of waiting messages and putting the telephone 3 in a normal conversation mode. All functionality is controlled by programmed means to be shown in a block diagram of the telephone, in FIG. 3. The contents of the waiting message, which can be pre-recorded by the manufacturer of the telephone, or, which can be recorded by means of a phone's microphone 27. The telephone 3 can be arranged to support Calling Line Identification, well-known in the art. Then, the Identification of the calling party is displayed on the display 21 when receiving a call.

Figure 3:
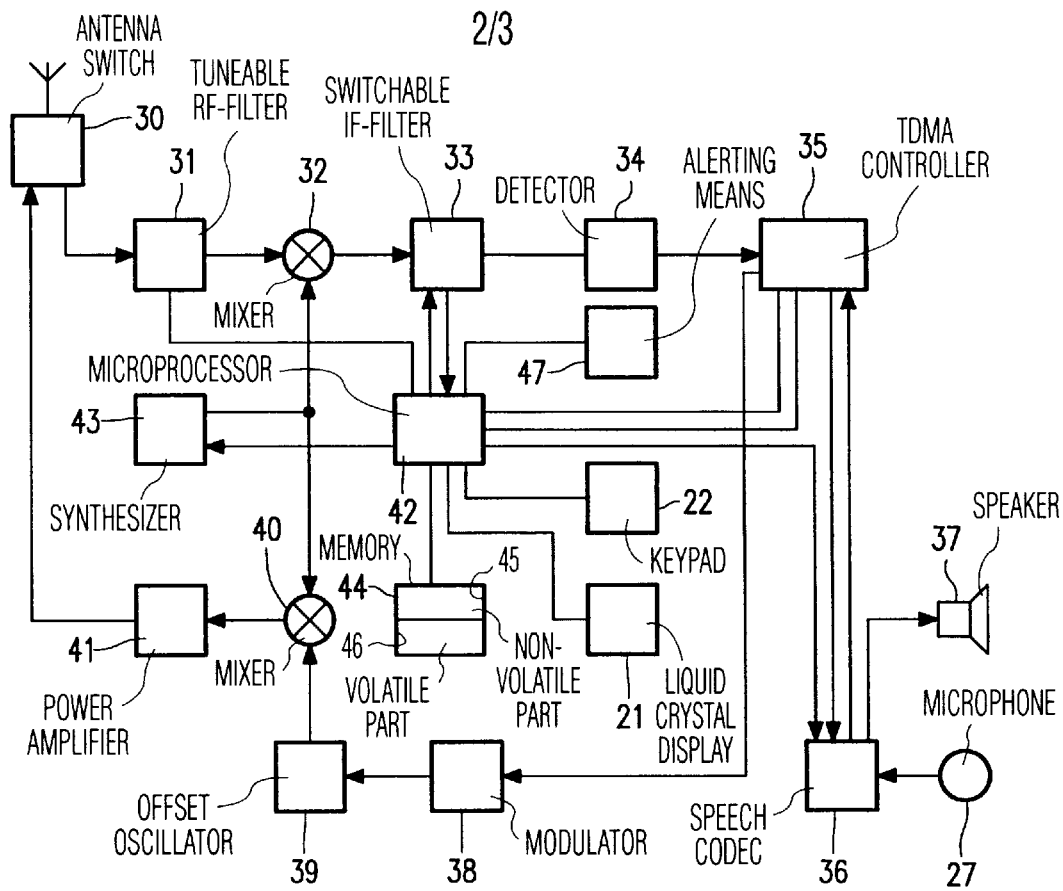
FIG. 3 shows a block diagram of the portable telecommunications device according to the present invention.

FIG. 3 shows a block diagram of the portable telecommunications device 3 according to the present invention. The device 3 comprises a reception path and a transmission path coupled to an antenna switch 30. The reception path comprises a cascade of a tuneable RF-filter 31, a mixer 32, a switchable IF-filter 33, a detector 34, a TDMA (Time Division Multiple Access) controller 35, a speech CODEC 36, and a speaker 37. The transmission path comprises a cascade of the microphone 27, the speech CODEC 36, the TDMA controller 35, a modulator 38, an offset oscillator 39, a mixer 40, and a power amplifier 41. A microprocessor 42 is provided for controlling the functionality of the telephone 3. Conventional functionality such as controlling a synthesizer 43 so as to tune to a specific frequency channel, controlling the TDMA controller 35, scanning the keypad 22, and controlling the display 21 is not described in further detail here, such functioning being well-known in the art. A memory 44 including a non-volatile memory part 45 and a volatile memory part 46 is coupled to the microprocessor 42. The non-volatile memory part 45 comprises a telephone functionality program and at least one stored waiting message according to the present invention. For alerting the called party alerting means 47 is provided which can be an audible alert, vibration means, or both. A vibration means has the advantage that persons in the vicinity of the called party are not disturbed by a audible alert.

Figure 4:
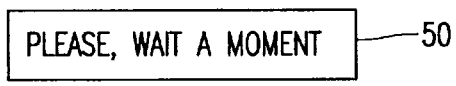
FIG. 4 shows a waiting message stored in the portable telecommunications device according to the present invention.

FIG. 4 shows a waiting message 50 having the contents "please, wait a moment". If the called party receives an incoming call, he is made aware of this call by the alerting means 47. If the called party presses the first key 25, the call is put on hold and the microprocessor periodically retrieves the message 50 from the memory 45, and periodically forwards the message 50 via the transmission path to the calling party. During transmission of the waiting messages the microphone 27 can be muted, and the alert means are switched off. In the meanwhile, the called party can move to another place from where he wants to make the conversation. After having arrived at the desired location the called party presses the key 26. Then the device 3 enters normal conversation mode and the conversation can be made. The device 3 may also comprise speech recognition means for recognising spoken commands. Such speech recognition means can be used, among other use, for recognising a waiting message command such as "set phone to waiting". Particularly when miniaturising cellular phones it would be cumbersome to have many additional keys. By using speech recognition, no extra keys are needed for the waiting message procedure. The microprocessor is suitably programmed to carry out the above functionality.

Figure 5:
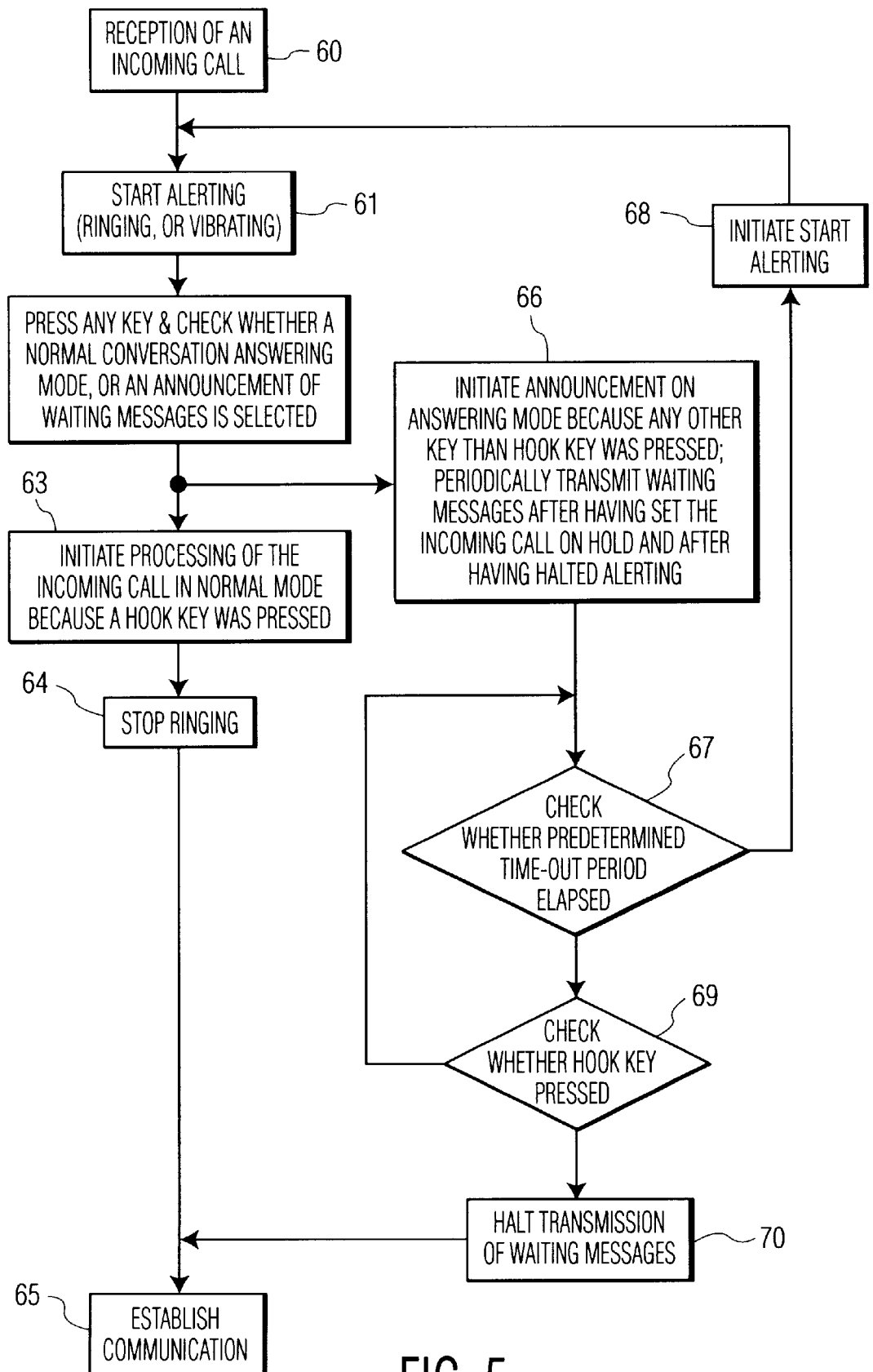
FIG. 5 shows a flowchart for illustrating the operation of method according to the present invention.

FIG. 5 shows a flowchart for illustrating the operation of a preferred method according to the present invention, whereby the portable device is menu driven and the called party has set the portable device in announcement on answer mode so as to transmit waiting messages to the calling party when receiving an incoming call. In the flowchart, respective blocks 60, 61, 62, 63, 64, 65, 66, 67, 68, 69, and 70 have the following meaning:

60: "Reception of an incoming call", 61: "Start alerting, in particular ringing or vibrating", 62: "Press any key and check whether a normal conversation answering mode is selected or an announcement of waiting messages answering mode, 63: "Initiate processing of the incoming call in normal answering mode because a hook key was pressed", 64: "Stop ringing", 65: "Establish communication", 66: "Initiate announcement on answering mode because any other key than the hook key was pressed, periodically transmit waiting messages after having set the incoming call on hold and after having halted alerting", 67: "Check whether a predetermined time-out period, 30 seconds, for instance, has lapsed", 68: "If so, initiate Start alerting", 69: "If not, check whether the hook key has been pressed". If the hook key has not been pressed check lapse of the time out period again. If the hook key has been pressed: 70: "Halt transmission of waiting messages and go to 65: "Establish communication".

Figure 6:
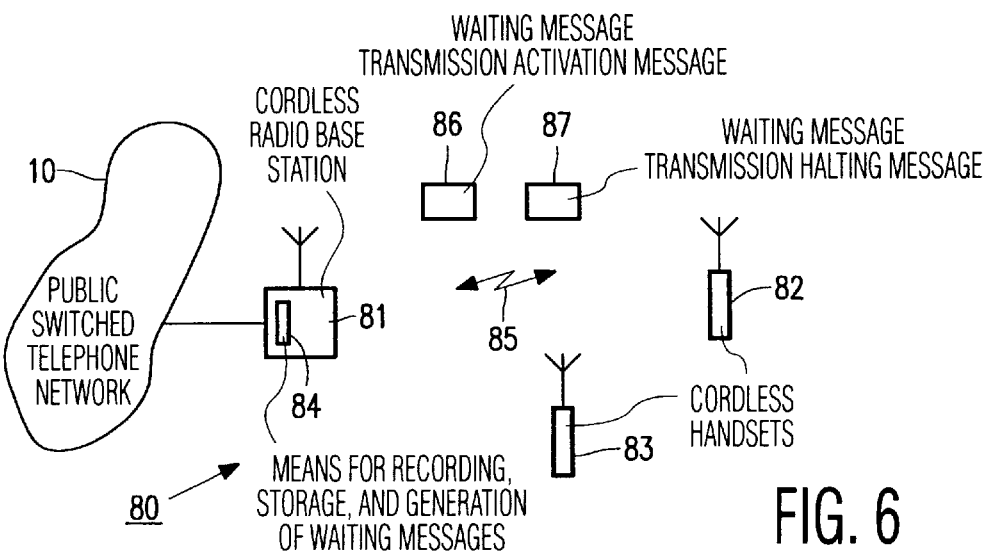
FIG. 6 shows a cordless telephone system according to the present invention.

FIG. 6 shows a cordless telephone system 80 according to the present invention comprising a cordless radio base station 81 coupled to the public switched telephone network, and cordless handsets 82 and 83. In an embodiment of the cordless telephone system according to the present invention, the radio base station 80 comprises means 84 for recording, storage, and generation of waiting messages. Shown is a radio link 85 between the radio base station 81 and the portable device 82. When receiving an incoming call, the portable device 82 initiates starting and halting of the transmission of waiting messages when the announcement on answering mode has been set. Stating is initiated by the portable device 82 by transmitting a waiting message transmission activation message 86 to the radio base station 81, and halting is initiated by transmitting a waiting message transmission halting message 87 to the radio base station 81. The cordless telephone system 80 can be a DECT (Digital European Cordless Telecommunications) system as standardised by ETSI (European Telecommunications Standards Institute).

In view of the foregoing it will be evident to a person skilled in the art that various modifications may be made within the spirit and the scope of the present invention as hereinafter defined by the appended claims and that the present invention is thus not limited to the examples provided. After a predetermined lapse of time after the beginning of the transmission of waiting messages the initially transmitted message could be replaced by a message like "Please, keep waiting, my phone is still connected to you but I will need some more time to find a suitable room for answering you". Herewith, it is possibly avoided that the calling party becomes impatient and hangs up. Such a variation and similar variations are within the scope of the present invention.

What is claimed is:

1. A portable telecommunications device controllable by a called party, the device comprising:

a radio transceiver;

memory means;

microprocessor means for controlling device functions;

alerting means for alerting the called party if an incoming call is received from a calling party;

message generating means for generating a waiting message intended for the calling party;

first initiating means for initiating periodic transmission of the waiting message to the calling party and for putting the device on hold while periodically transmitting the waiting message; and second initiating means for halting the periodic transmission of the waiting message and for putting the device in normal communication mode after halting of the periodic transmission of the waiting message, the first and second initiating means being controllable by the called party, and the called party and the calling party being subscribers.

2. A portable telecommunications device according to claim 1, wherein the first initiating means comprises a first key and the second initiating means comprises a second key, and alerting stops if the first key is pressed.

3. A portable telecommunications device according to claim 2, wherein the first key is a key dedicated to the first initiating means and the second key is a key which can also be used for other telephone functions but on-hook.

4. A portable telecommunications device according to claim 1, wherein the memory means comprises non-volatile memory means for storing the waiting message.

5. A portable telecommunications device according to claim 4, wherein the waiting message is stored in the non-volatile memory by the manufacturer of the device.

6. A portable telecommunications device according to claim 4, comprising recording means for recording a waiting message, wherein the recorded message is written into the non-volatile memory.

7. A portable telecommunications device according to claim 1, comprising a microphone, wherein the device is arranged for muting the microphone while transmitting the waiting messages.

8. A portable telecommunications device according to claim 1, comprising speech recognition means, wherein the speech recognition means are arranged for recognising a waiting message command applied by the device for the initiation of the periodic transmission of waiting messages after recognition of the waiting message command.

9. A portable telecommunications device according to claim 1, wherein the alerting means is a silent alarming means.

10. A portable telecommunications device according to claim 9, wherein the silent alarming means is a vibration means.

11. A portable telecommunications device according to claim 1, wherein the device supports the functionality of calling line identification.

12. A wireless telecommunications system with at least one radio base station, and a portable telecommunications device controllable by a called party, the portable telecommunications device comprising:

a radio transceiver;

memory means;

microprocessor means for controlling device functions;

alerting means for alerting the called party if an incoming call is received from a calling party;

message generating means for generating a waiting message intended for the calling party;

first initiating means for initiating periodic transmission of the waiting message to the calling party and for putting the device on hold while periodically transmitting the waiting message; and second initiating means for halting the periodic transmission of the waiting message and for putting the device in normal communication mode after halting of the periodic transmission of the waiting message, the first and second initiating means being controllable by the called party, and the called party and the calling party being subscribers.

13. A wireless telecommunications system according to claim 12, modified in that the message generation means are comprised in the radio base station, that the transmission of waiting messages is done by the base station after having received a waiting message transmission activation message from the portable device, and that the transmission of waiting messages is halted after having received a waiting message transmission halting message from the portable device.

14. A radio base station for use in a telecommunications system according to claim 13, comprising evaluation means for evaluating the waiting message transmission activation message so as to start the periodic transmission of waiting message and for evaluating the waiting message transmission halting message so as to halt the transmission of waiting messages.

15. A method of processing an incoming call from a first subscriber of a first portable telecommunications device to a second subscriber of a second portable telecommunications device, the method comprising:

alerting the second subscriber upon reception of the incoming call;

generating in the second telecommunications device a waiting message intended for the first subscriber;

initiating by the second subscriber a periodic transmission of the waiting message to the first subscriber and putting the incoming call on hold while periodically transmitting the waiting message; and initiating by the second subscriber a halting of the periodic transmission of the waiting message and establishing normal communication between the first and second subscribers after the halting.

* * * * *